US005413886A

United States Patent [19]

Pai et al.

[11] Patent Number: 5,413,886

[45] Date of Patent: May 9, 1995

[54] TRANSPORT LAYERS CONTAINING TWO OR MORE CHARGE TRANSPORTING MOLECULES

[75] Inventors: Damodar M. Pai, Fairport; Huoy-Jen Yuh, Pittsford; John F. Yanus, Webster; Andrew R. Melnyk; Ralph A. Mosher, both of Rochester; Tsu-Sen Chow, Penfield, all of N.Y.

[73] Assignee: Xerox Corporation, Stamford, Conn.

[21] Appl. No.: 904,291

[22] Filed: Jun. 25, 1992

[51] Int. Cl.[6] .............................................. C08G 5/145

[52] U.S. Cl. ....................................... 430/58; 430/59; 430/78

[58] Field of Search .............................. 430/59, 78, 58

[56] References Cited

U.S. PATENT DOCUMENTS

| | | | |
|---|---|---|---|
| 4,075,013 | 2/1978 | Ward et al. | 96/1.5 |
| 4,388,392 | 6/1983 | Kato et al. | 430/58 |
| 4,587,189 | 5/1986 | Hor et al. | 430/59 |
| 4,728,593 | 3/1988 | Freilich et al. | 430/72 |
| 4,758,488 | 7/1988 | Johnson et al. | 430/59 |
| 4,999,272 | 3/1991 | Tanikawa et al. | 430/106 |
| 5,192,633 | 3/1993 | Iwasaki et al. | 430/58 |

*Primary Examiner*—John Kight, III
*Assistant Examiner*—John M. Cooney, Jr.
*Attorney, Agent, or Firm*—Kenyon & Kenyon

[57] ABSTRACT

An electrophotographic imaging member including a charge generating layer and a charge transport layer, the charge transport layer having two or more charge transporting molecules having ionization potentials within 0.2 electron Volts of each other. This imaging member has stress characteristics that reduces curling, cracking and delamination from the substrate.

16 Claims, 2 Drawing Sheets

TRANSPORT LAYERS CONTAINING TWO OR MORE CHARGE TRANSPORTING MOLECULES

BACKGROUND OF THE INVENTION

This invention relates in general to electrophotographic imaging members and more specifically, to imaging members comprising multilayer organic photoconductors utilizing a transport layer in which two or more charge transporting molecules are dispersed in a non-charge transporting binder.

In the art of electrophotography an electrophotographic plate comprising a photoconductive insulating layer on a conductive layer is imaged by first uniformly electrostatically charging the imaging surface of the photoconductive insulating layer. The plate or photoreceptor is then exposed to a pattern of activating electromagnetic radiation such as light, which selectively dissipates the charge in the illuminated areas of the photoconductive insulating layer while leaving behind an electrostatic latent image in the non-illuminated area. This electrostatic latent image may then be developed to form a visible image by depositing finely divided toner particles, for example as a dry powder or alternatively suspended in a liquid carrier, on the surface of the photoconductive insulating layer. The resulting visible toner image can be transferred to a suitable receiving member such as paper. This imaging process may be repeated many times with reusable photoconductive insulating layers.

One common type of photoreceptor is a multilayered device that comprises a conductive layer, a blocking layer, an adhesive layer, a charge generating layer, and a charge transport layer. Either the charge generating layer or the charge transport layer may be located adjacent the conductive layer. The charge transport layer can contain an active aromatic diamine small molecule charge transport compound dissolved or molecularly dispersed in a film forming binder. This type of charge transport layer is described, for example in U.S. Pat. No. 4,265,990. Although excellent toner images may be obtained with such multilayered photoreceptors, it has been found that when high concentrations of active aromatic diamine small molecule charge transport compound are dissolved or molecularly dispersed in a film forming binder, the small molecules tend to crystallize with time under conditions such as higher machine operating temperatures, mechanical stress or exposure to chemical vapors. Such crystallization can cause undesirable changes in the electro-optical properties, such as residual potential build-up which can cause cycle-up. Moreover, the range of binders and binder solvent types available for use during coating operations is limited with high concentrations of the small molecules are sought for the charge transport layer.

Another type of charge transport layer has been developed which utilizes a charge transporting polymer. This type of charge transport polymer includes materials such as poly N-vinyl carbazole, polysilylenes, and others including those described in U.S. Pat. Nos. 4,806,443, 4,806,444, 4,818,650, 4,935,487 and 4,956,440. Other charge transporting materials include polymeric arylamine compounds and related polymers described in U.S. Pat. Nos. 4,801,517, 4,806,444, 4,818,650 and 4,806,443 the disclosures of which are incorporated herein by reference in their entirety. Some polymeric charge transporting materials have relatively low charge carrier mobilities. Mechanical properties of these pendant type polymers, such as poly N-vinyl carbazole and polystyryl anthracene, is less than adequate for photoreceptor belt fabrication and operation. Moreover, the cost of charge transporting polymers having high concentrations of charge transporting moieties in the polymer chain can be very costly.

The sensitivity of a layered device depends on several factors: (1) the fraction of the light absorbed, (2) the efficiency of photogeneration within the pigment crystals, (3) the efficiency of injection of photogenerated holes into the transport layer and (4) the distance the injected carrier travels in the transport layer between the exposure and development steps. The fraction of the light absorbed can be maximized by the employment of adequate concentration of pigment in the generator layer and the thickness of the generator layer. The distance the carrier travels in the transports layers depends on the structure of transporting material and the binder and on the concentration of the charge transporting active molecules in the case of transport layers consisting of a dispersion of transport active molecules in a non-transporting inactive binder. However, depending on the structure of the binder and the molecule, crystallization sets in if the concentration of the charge transporting molecules is increased beyond a certain point. Crystallization results in increased residuals and image defects both of which are undesirable. Therefore, the concentration limit of the charge transporting molecules in the transport layer results in a limit to the speed of the xerographic process. If the time between exposure and development is reduced to a value that is lower than the transit time in the charge transport layer of the charge carrier injected from the generator layer, the sensitivity of the device is reduced.

The organic photoreceptor devices currently in use in the reprographic industry employ layered structures which, in general, comprising ground plane, blocking, adhesive, generator and transport layers. The layers are typically either vacuum or solvent coated separately onto an underlying layer or substrate. The surface of the photoreceptor or any of the layers can be constrained due to the interfacial force. The interfacial force S can be related to the external and internal strains $\epsilon$ applied to the systems, the material Young's modulus E and Poisson's ratio by the following equation:

$$S=(\epsilon_1-\epsilon_2)/(1/C_1L_1+1/C_2L_2+L_2/4\times(D_1+D_2)),$$

where, $C_i=E_i/(1-v_i^2)$ and $D_i=C_iL_i^3/12$. This equation has been discussed in detail by Chow, et al. (Polymer Engineering and Science, 17, 436 (1977) and 25, 367 (1985)). It is often critical to eliminate or minimize internal stress build up, which can cause curling of the composite, susceptibility to delamination, and cracking of the brittle layers.

For solvent coated polymeric layers, the internal stress can build up during drying and solvent evaporation processes. The degree of internal stress built up during these processes depends on the interlayer solvent diffusion and the stress relaxation degree of the layers. The latter is a function of the drying temperature, the drying time and the material intrinsic properties. One important parameter that characterizes the material intrinsic properties of stress relaxation during drying is their glass transition temperature, $T_g$. In general the lower the $T_g$ of the material, the more easily the material can be relaxed within a confined drying temperature and time.

In most organic photoreceptor devices, the internal stress builds up during transport layer coating and drying processes. This is due to the much larger thickness of the transport layer (about 20 micrometers) as compared to the other layers (less than about one micrometers) and due to the brittleness of the generator, adhesive and blocking layers. Therefore, curling, cracking and delamination are often observed on these photoreceptor devices after the transport layer fabrication. It would be advantageous to reduce such internal stress by using a transport layer formula of lower $T_g$.

SUMMARY OF THE INVENTION

It is, therefore, an object of the present invention to provide an improved electrophotographic imaging member which overcomes some or all of the disadvantages noted above.

It is another object of the present invention to provide an electrophotographic imaging member which avoids crystallization when the total charge transporting molecular concentration is high.

It is yet another object of the present invention to provide an electrophotographic imaging member in which the $T_g$ can be lowered to account for the stress considerations.

It is still another object of the present invention to provide an electrophotographic imaging member that exhibits high charge carrier mobilities.

It is also an object of the present invention to increase the charge carrier mobility to be able to reduce the time between exposure and development.

It is another object of the present invention to increase the charge carrier mobility by fabricating a transport layer with two or more types of charge transporting molecules in an inactive binder, wherein the transport molecules have ionization potentials that are very close to each other and, therefore, provide additive transport properties.

The foregoing objects and others are accomplished in accordance with this invention by providing an electrophotographic imaging member comprising a charge generating layer and a charge transport layer, wherein the charge transport layer comprises two or more different charge transporting small molecules dissolved or molecularly dispersed in a non-charge transporting binder polymer and wherein the ionization potential ($I_p$) of charge transport molecules are very close to each other. This imaging member may be employed in an electrophotographic imaging process.

Electrostatographic imaging members are well known in the art and may be prepared by various suitable techniques. Typically, a flexible or rigid substrate is provided having an electrically conductive surface. A charge generating layer is then applied to the electrically conductive surface. A charge blocking layer may be applied to the electrically conductive surface prior to the application of the charge generating layer. If desired, an adhesive layer may be utilized between the charge blocking layer and the charge generating layer. Usually the charge generation layer is applied onto the blocking layer and a charge transport layer is formed on the charge generation layer. However, in some embodiments, the charge transport layer is applied prior to the charge generation layer.

The substrate may be opaque or substantially transparent and may comprise numerous suitable materials having the required mechanical properties. Accordingly, the substrate may comprise a layer of an electrically non-conductive or conductive material such as an inorganic or an organic composition. Suitable electrically non-conducting materials include, for example, various resins known for this purpose including polyesters, polycarbonates, polyamides, polyurethanes, and the like, which are flexible as thin webs. The electrically insulating or conductive substrate may be in the form of an endless flexible belt, a web, a rigid cylinder, a sheet and the like.

The thickness of the substrate layer depends on numerous factors, including strength desired and economical considerations. Thus, this layer for a flexible belt may be of substantial thickness, for example, about 125 micrometers, or of minimum thickness, for example, less than 50 micrometers, provided there are no adverse effects on the final electrostatographic device. The surface of the substrate layer is preferably cleaned prior to coating to promote greater adhesion of the deposited coating. Cleaning may be effected, for example, by exposing the surface of the substrate layer to plasma discharge, ion bombardment and the like.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 angstrom units to about 750 angstrom units, and more preferably from about 100 angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium, hafnium, titanium, nickel, stainless steel, chromium, tungsten, molybdenum, and the like. In general, a continuous metal film can be attained on a suitable substrate, e.g. a polyester web substrate such as Mylar available from E. I. dupont de Nemours & Co. with magnetron sputtering.

If desired, an alloy of suitable metals may be deposited. Typical metal alloys may contain two or more metals such as zirconium, niobium, tantalum, vanadium, hafnium, titanium, nickel, stainless steel, chromium, tungsten, molybdenum, and the like, and mixtures thereof. A typical electrical conductivity for conductive layers for electrophotographic imaging members in slow speed copiers is about $10^2$ to $10^3$ ohms/square.

After formation of an electrically conductive surface, a hole blocking layer may be applied thereto for photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may comprise nitrogen containing siloxanes or nitrogen containing titanium compounds, such as trimethoxysilyl propylene diamine, hydrolyzed trimethoxysilyl propyl ethylene diamine, N-beta-(aminoethyl) gamma-aminopropyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylaminoethylamino)titanate, isopropyl trianthranil titanate, isopropyl tri(N,N-dimethylethylamino)titanate, titanium-4-amino benzene sulfonate oxyacetate, titanium 4-aminobenzoate isostearate oxyacetate, $[H_2N(CH_2)_4]CH_3Si(OCH_3)_2$, (gammaaminobutyl) methyl diethoxysilane, and $[H_2N(CH_2)_3]CH_3Si(OCH_3)_2$ (gammaaminopropyl) methyl diethoxysilane, as disclosed in U.S. Pat. Nos. 4,338,387, 4,286,033 and 4,291,110. The disclosures of U.S. Pat. Nos. 4,338,387, 4,286,033 and 4,291,110 are incorporated herein in their entirety. A preferred blocking layer comprises a reaction product between a hydrolyzed silane and the oxidized surface of a metal ground plane layer. The blocking layer may be applied by any suitable conventional technique such as spraying, dip coating, draw bar coating, gravure coating, silk screening, air knife coating, reverse roll coating, vacuum deposition, chemical treatment and the like. The blocking layer should be continuous and have a thickness of less than about 0.2 micrometer because greater thicknesses may lead to undesirably high residual voltage.

An optional adhesive layer may be applied to the hole blocking layer. Any suitable adhesive layer well known in the art may be utilized. Typical adhesive layer materials include, for example, polyesters, dupont 49,000 (available from E. I. duPont de Nemours and Company), Vitel PE100 (available from Goodyear Tire & Rubber), polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigments. Phthalocyanines have been employed as photogenerating materials for use in laser printers with infrared exposures. Infrared sensitivity is required for low cost semiconductor laser diodes used as the light exposure source. The absorption spectrum and photosensitivity depend on the central metal atom. Many metal phthalocyanines have been reported and include, oxyvanadium phthalocyanine, chloroaluminum phthalocyanine, copper phthalocyanine, oxytitanium phthalocyanine, chlorogallium phthalocyanine, magnesium phthalocyanine and metal-free phthalocyanine. The phthalocyanines exist in many crystal forms which have a strong influence on photogeneration. Other pigments that can be employed include dibromoanthanthrone, squarylium, quinacridones available from DuPont under the tradename Monastral Red, Monastral violet and Monastral Red Y, Vat orange 1 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like, dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639. Other suitable photogenerating materials known in the art may also be utilized, if desired. Charge generating binder layers comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Metal phthalocyanines, metal free phthalocyanines and tellurium alloys are also preferred because these materials provide the additional benefit of being sensitive to infrared light.

Any suitable polymeric film forming binder material may be employed as the matrix in the photogenerating binder layer. Typical polymeric film forming materials include those described, for example, in U.S. Pat. No. 3,121,006. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material preferably ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. However, thicknesses outside these ranges can be selected.

Any suitable and conventional technique may be utilized to mix and thereafter apply the photogenerating layer coating mixture. Typical application techniques include spraying, dip coating, roll coating, wire wound rod coating, and the like. Drying of the deposited coating may be effected by any suitable conventional technique such as oven drying, infra red radiation drying, air drying and the like.

The active charge transport layer of this invention comprises a mixture of at least two or more types of charge transporting small molecule dissolved or molecularly dispersed in a film forming inactive binder polymer. The charge transporting small molecules are selected from the group consisting of diamines of the structure:

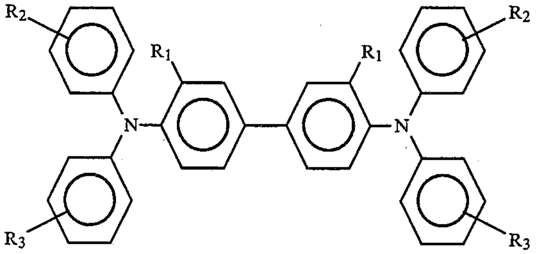

triphenylamines of the structure:

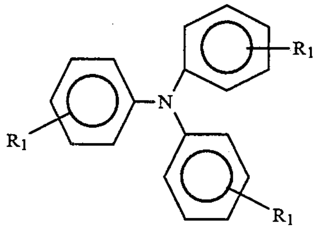

and triphenyl methanes of the structure:

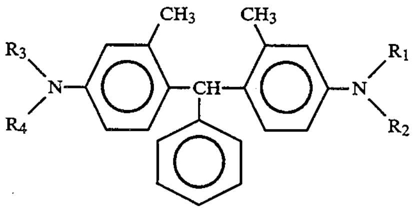

where $R_1$, $R_2$, $R_3$ and $R_4$ are selected from hydrogen and alkyl groups.

The binder polymer for fabricating the transport layers include varieties of polycarbonates, polystyrene, polyesters and the like. The ionization potential of the two types of molecules that are employed in the fabrication of the transport layer are most preferably matched to be within about 0.2 electron volts of each other.

Any suitable and conventional technique may be utilized to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infra red radiation drying, air drying and the like.

Generally, the thickness of the charge transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layers is preferably maintained from about 2:1 to 200:1 and in some instances as great as 400:1. In other words, the charge transport layer, is substantially non-absorbing to visible light or radiation in the region of intended use but is "active" in that it allows the injection of photogenerated holes from the photoconductive layer, i.e., charge generation layer, and allows these holes to be transported through the active charge transport layer to selectively discharge a surface charge on the surface of the active layer.

Other layers may also be used such as conventional electrically conductive ground strip along one edge of the belt or drum in contact with the conductive layer, blocking layer, adhesive layer or charge generating layer to facilitate connection of the electrically conductive layer of the photoreceptor to ground or to an electrical bias. Ground strips are well known and usually comprise conductive particles dispersed in a film forming binder.

An overcoat layer also be utilized to improve resistance to abrasion. In some cases an anti-curl back coating may be applied to the side opposite the photoreceptor to provide flatness and/or abrasion resistance. These overcoating and anti-curl back coating layers are well known in the art and may comprise thermoplastic organic polymers or inorganic polymers that are electrically insulating or slightly semi-conductive. Overcoatings are continuous and generally have a thickness of less than about 10 micrometers.

DETAILED DESCRIPTION OF THE DRAWINGS

Figure 1:
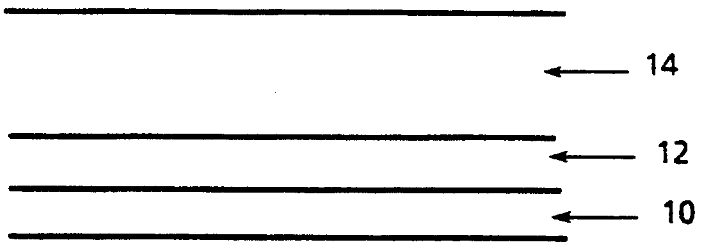

FIG. 1 schematically illustrates an electrophotographic photoreceptor 1 that includes a conductive substrate 10 a charge generator layer 12 that contacts the substrate 10, and a charge transport layer 14 formed on the charge generator layer 12. The charge transport layer comprises a binder polymer and at least two types of charge transporting molecules.

Figure 2:
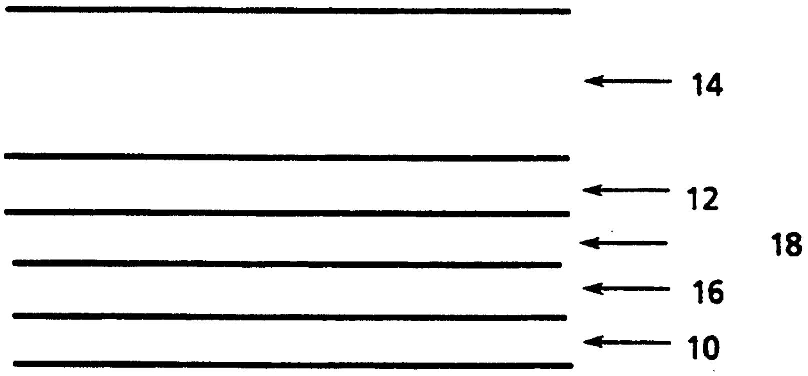

FIG. 2 schematically illustrates and electrophotographic photoreceptor 1 that includes a conductive substrate 10, a barrier layer 16, an adhesive layer 18, a charge generator layer 12 that contacts the adhesive layer 18, and a charge transport layer 14 formed on the charge generator layer 12. The charge transport layer comprises a binder polymer and at least two types of charge transporting molecules.

Figure 3:
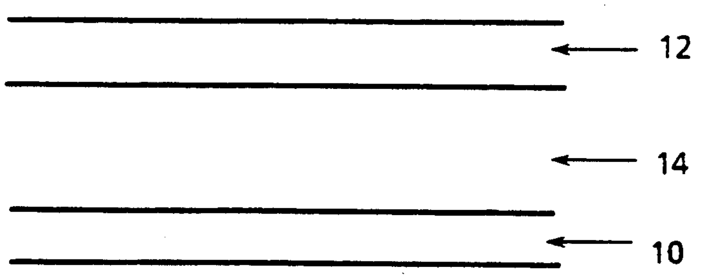

FIG. 3 schematically illustrates an electrophotographic photoreceptor 1 that includes a conductive substrate 10, a charge transport layer 14 that contacts the substrate 10, and a charge generator layer 12 formed on the charge transport layer 14. The charge transport layer comprises a binder polymer and at least two types of charge transporting molecules.

Examples are set forth herein below and are illustrative of different compositions and conditions that can be utilized in practicing the invention. All proportions are by weight unless otherwise indicated. It will be apparent, however, that the invention can be practiced with many types of composition and can have many different uses in accordance with the disclosure above and as pointed out hereinafter.

EXAMPLE 1

Three devices were fabricated as follows: Up to the point of the transport layer coating the three devices were very similar and consisted of a substrate comprising a vacuum deposited titanium layer on a polyethylene terephthalate film (Melinex, available from Imperial Chemical Industries). The first coating was a siloxane barrier layer formed from hydrolyzed gamma aminopropyltriethoxysilane having a thickness of 100 angstroms. The second coating was an adhesive layer of polyester resin (49,000, available from E. I. duPont de Nemours & Co.) having a thickness of 50 angstroms. The next coating was a charge generator layer containing 35% by weight vanadyl phthalocyanine particles dispersed in a polyester resin (Vitel PE100, available from Goodyear Tire and Rubber Co.) having a thickness of 1 micrometer.

The three devices had different transport layers. Device # 1 had a charge transport layer of a dispersion of aromatic diamine donor molecules in polycarbonate resin (Makrolon, available from Farbenfabricken Bayer A.G.) having a thickness of 20 micrometers. The transport layer was fabricated as follows. One gram of Makrolon® polycarbonate and 1 gram of the aromatic diamine N,N'-diphenyl-N,N'-bis(3-methylphenyl)-(1,1'-biphenyl)-4,4'-diamine are dissolved in 11.4 grams of methylene chloride. After dissolution, the mixture was coated on the substrate containing the charge generator layer using a 3 mil Bird film applicator. The film was dried in a forced air oven at 100° C. for 20 minutes. The transport layer of Device #2 had a dispersion of two transport molecules, the aforementioned N,N'-diphenyl-N,N'-bis(3-methylphenyl)-(1,1'-biphenyl)-4,4'-diamine (Diamine) and p-tritolyl amine (TTA) in polycarbonate in the weight ratio 4:1:5. Device #3 had a transport layer of Diamine and TTA in polycarbonate in the weight ratio 2.5:2.5:5. In a vacuum chamber, semitransparent gold electrodes were then deposited on top of each of the three devices.

The charge carrier mobility in the transport layers of the three devices was measured as follows. The sandwich device is connected in an electrical circuit containing a power supply and a current measuring resistance. The transit time of the carriers is determined by the time of flight technique. This is accomplished by biassing the gold electrode negative and exposing the device to a short flash of light. Holes photogenerated in the generator layer of vanadyl phthalocyanine are injected into and transit through the transport layer. The current due to the transit of a sheet of holes is time resolved and displayed on an oscilloscope. The current pulse consists of a flat portion followed by a rapid decrease. The flat portion is due to the transit of the sheet of holes through the transport layer. The rapid drop of current signals the arrival of the holes at the gold electrode. From the transit time, the velocity of the carriers is calculated by the relation: velocity=transport layer thickness divided by the transit time. The hole mobility is related to the velocity by the relation: velocity=(mobility)×(electric field). The mobility of the three transport layers at an applied field of $10^5$ volts/cm are very close to each other as indicated in Table 1. The equivalence of charge carrier mobilities suggests that the ionization potentials of these two charge transporting molecules are within 0.2 electron volts of each other and the transport is additive.

TABLE 1

| Transport Layer Composition by weight | Hole mobility in $cm^2$/volt sec. at $10^5$ Volts/cm |
|---|---|
| 5:5 of Diamine:Polycarbonate | $1.2 \times 10^{-5}$ |
| 4:1:5 of Diamine:TTA: Polycarbonate | $10^{-5}$ |
| 2.5:2.5:5 of Diamine:TTA: Polycarbonate | $10^{-5}$ |

EXAMPLE 2

The glass transition temperature of the three transport layers of (1) N,N'-diphenyl-N,N'-bis(3-methylphenyl)-(1,1'-biphenyl)-4,4'-diamine in polycarbonate, (2) p- tritolyl amine in polycarbonate and (3) mixtures of N,N'-diphenyl-N,N'-bis(3-methylphenyl)-(1,1'-biphenyl)-4,4'-diamine and p- tritolyl amine in polycarbonate were determined by the well known technique of Differential Scanning Calorimetry (DSC) and are shown in Table 2. A systematic reduction of glass transition temperatures in layers containing mixtures two charge molecules is seen.

TABLE 2

| Transport Layer Composition by weight | Glass Transition Temperature Tg |
|---|---|
| 5:5 of Diamine:Polycarbonate | 84° C. |
| 4:1:5 of Diamine:TTA: Polycarbonate | 75° C. |
| 2.5:2.5:5 of Diamine:TTA: Polycarbonate | 57° C. |
| 5:5 of TTA:Polycarbonate | 52° C. |

EXAMPLE 3

Two devices were fabricated as follows: Up to the point of transport layer coating the devices were very similar and consisted of a substrate comprising a vacuum deposited titanium layer on a polyethylene terephthalate film (Melinex, available from Imperial Chemical Industries). The first coating was a siloxane barrier layer formed from hydrolyzed gamma aminopropyltriethoxysilane having a thickness of 100 angstroms. The second coating was an adhesive layer of polyester resin (49,000, available from E. I. duPont de Nemours & Co.) having a thickness of 50 angstroms. The next coating was a charge generator layer containing 35% by weight vanadyl phthalocyanine particles dispersed in a polyester resin (Vitel PE 100, available from Goodyear Tire and Rubber Co.) having a thickness of 1 micrometer. The two devices had different transport layers. Device #1 had a charge transport layer of dispersion of aromatic diamine donor molecules in polycarbonate resin (Makrolon, available from Farbenfabricken Bayer A.G.) having a thickness of 20 micrometers and in the weight ratio of 4:6. The transport layer was fabricated as follows. 1.2 grams of Makrolon® polycarbonate and 0.8 gram of the aromatic diamine N,N'-diphenyl-N,N'-bis(3-methylphenyl)-(1,1'-biphenyl)-4,4'-diamine are dissolved in 13.7 grams of methylene chloride. After dissolution, the mixture was coated on the substrate containing the charge generator layer using a 3 mil Bird film applicator. The film was dried in a forced air oven at 100° C. for 20 minutes. The transport layer of Device #2 was a dispersion of two transport molecules, the aforementioned N,N'-diphenyl-N,N'-bis(3-methylphenyl)-(1,1'-biphenyl)-4,4'-diamine (Diamine) and bis(4-diethylamino-2-methylphenyl)-phenylmethane (BDETPM) in polycarbonate in the weight ratio 2:2:6.

The charge carrier mobility in the transport layers of the two devices was measured as described in Example 1. The charge carrier mobility at $10^5$ volts/cm of the two transport layers were $2\times10^{-6}$ and $3\times10^{-6}$ $cm^2$/volt sec respectively. The closeness of the two values of the charge carrier mobility suggests that the ionization potentials of these two sets of charge transporting molecules are within 0.2 electron volts of each other.

EXAMPLE 4

The glass transition temperature of the transport layers of (1) N,N'-diphenyl-N,N'-bis(3-methylphenyl)-(1,1'-biphenyl)-4,4, diamine in polycarbonate, (2) bis(4-diethylamino-2-methylphenyl)-phenylmethane (BDETPM) in polycarbonate, and (3) mixtures of N,N'-diphenyl-N,N'-bis(3-methylphenyl)-(1,1'-biphenyl)-4,4'-diamine and bis( 4-diethylamino-2-methylphenyl) -phenylmethane in polycarbonate were determined by Differential Scanning Calorimetry technique and are is shown in Table 3. A systematic reduction of glass transition temperatures in layers containing mixtures two charge molecules is seen.

TABLE 3

| Transport Layer Composition by weight | Glass Transition Temperature Tg |
|---|---|
| 4:6 of Diamine:Polycarbonate | 92° C. |
| 2:2:6 of Diamine:BDETPM: Polycarbonate | 70° C. |
| 3:1:6 of Diamine:BDETPM: Polycarbonate | 70° C. |
| 1:3:6 of Diamine:BDETPM Polycarbonate | 60° C. |

Although the invention has been described with reference to specific preferred embodiments, it is not intended to be limited thereto, rather those skilled in the art will recognize that variations and modifications may be made therein which are within the spirit of the invention and within the scope of the claims. All patents and other references cited herein are incorporated by reference as if fully set forth.

What is claimed is:

1. An electrophotographic imaging member comprising a charge generating layer and a charge transport layer, said charge transport layer comprising two or more different charge transporting small molecules dissolved or molecularly dispersed in an electrically inactive film forming binder polymer wherein each of said charge transporting small molecules is selected from the group consisting of diamines of the structure:

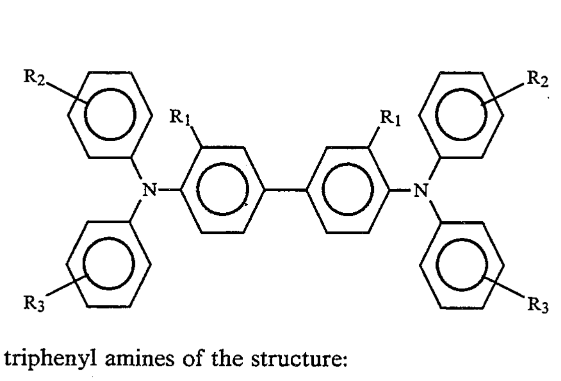

triphenyl amines of the structure:

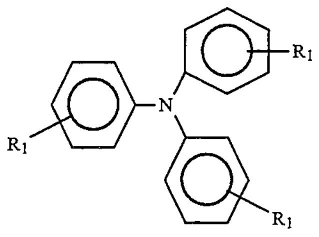

and triphenyl methanes of the structure:

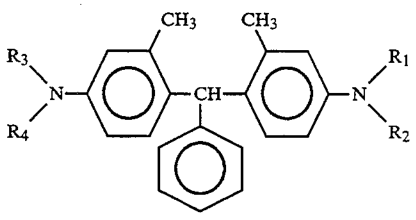

where $R_1$, $R_2$, $R_3$, and $R_4$ are selected from the group consisting of hydrogen and alkyl groups.

2. An electrophotographic imaging member according to claim 1 wherein the ratio by weight of said charge transporting small molecules to said binder polymer is between about 20:80 and about 75:25.

3. An electrophotographic imaging member according to claim 1, wherein the charge transport layer has a thickness of between about 5 micrometers and about 50 micrometers.

4. An electrophotographic imaging member according to claim 1 wherein said charge generating layer has a thickness of between about 0.05 micrometer and about 10 micrometers.

5. An imaging member according to claim 1 wherein the charge generating layer is between said substrate and said charge transport layer.

6. An electrophotographic imaging member according to claim 1 wherein the substrate is comprised of a drum.

7. An electrophotographic imaging member according to claim 1 wherein the substrate is a flexible belt with a transparent conductive coating and the said supporting substrate is transparent.

8. An electrophotographic imaging member according to claim 1 wherein the ionization potentials of said two or more charge transporting small molecules are within about 0.2 eV of each other.

9. An electrophotographic imaging member according to claim 1 wherein the transport provided by said charge transporting small molecules is additive.

10. An imaging process comprising:

providing an electrophotographic imaging member comprising a charge generating layer and a charge transport layer, said charge transport layer comprising two or more different charge transporting small molecules dissolved or molecularly dispersed in an electrically inactive film forming binder polymer wherein each of said charge transporting molecules is selected from the group consisting of diamines of the structure:

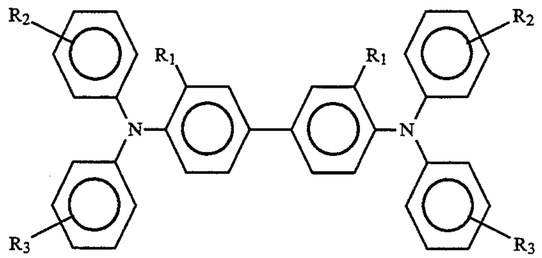

triphenyl amines of the structure:

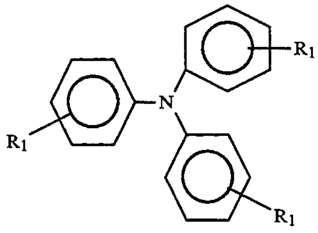

and triphenyl methanes of the structure:

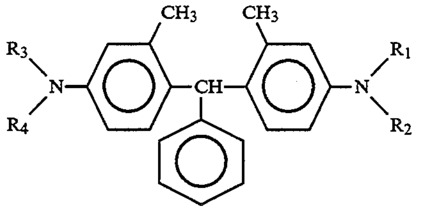

where $R_1$, $R_2$, $R_3$, and $R_4$ are selected from the group consisting of hydrogen and alkyl groups, depositing a uniform electrostatic charge on said member with a corona charging device, exposing said imaging member to activating radiation in image configuration to form an electrostatic latent image on said imaging member, developing said electrostatic latent image with electrostatically attractable marking particles to form a toner image, transferring said toner image to a receiving member and repeating said depositing, exposing, developing and transferring steps.

11. An imaging process according to claim 10 wherein the ionization potentials of said two or more charge transporting small molecules are within about 0.2 eV of each other.

12. An imaging process according to claim 10 wherein the transport provided by said charge transporting small molecules is additive.

13. An electrophotographic imaging member comprising a charge generating layer and a charge transport layer, said charge transport layer comprising charge transporting species consisting essentially of two or more different charge transporting small molecules dissolved or molecularly dispersed in an electrically inactive film-forming binding polymer wherein said two or more different charge transporting small molecules are selected from the group consisting of diamines of the structure:

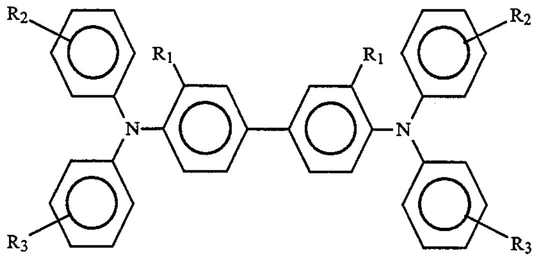

triphenylamines of the structure,

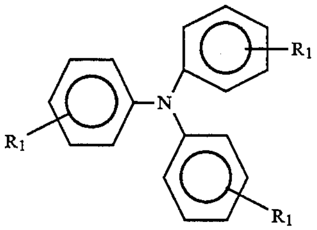

and triphenylmethanes of the structure,

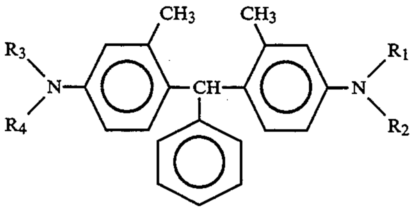

wherein $R_1$, $R_2$, $R_3$, and $R_4$ are selected from the group consisting of hydrogen and alkyl groups.

14. An electrophotographic imaging member according to claim 13 wherein said two or more different charge transporting small molecules are selected from the group consisting of N,N'-diphenyl-N,N'-bis(3-methylphenyl)-(1,1'-biphenyl)-4,4'-diamine, p-tritolyl amine, and bis(4-diethylamino-2-methylphenyl)-phenylmethane.

15. An electrophotographic imaging member according to claim 1 wherein said two or more different charge transporting small molecules are selected from the group consisting of N,N'-diphenyl-N,N'-bis(3-methylphenyl)-(1,1'-biphenyl)-4,4'-diamine, p-tritolyl amine, and bis(4-diethylamino-2-methylphenyl)-phenylmethane.

16. An electrophotographic imaging member according to claim 10 wherein said two or more different charge transporting small molecules are selected from the group consisting of N,N'-diphenyl-N,N'-bis(3-methylphenyl)-(1,1'-biphenyl)-4,4'-diamine, p-tritolyl amine, and bis(4-diethylamino-2-methylphenyl)-phenylmethane.

* * * * *